Figure 1:
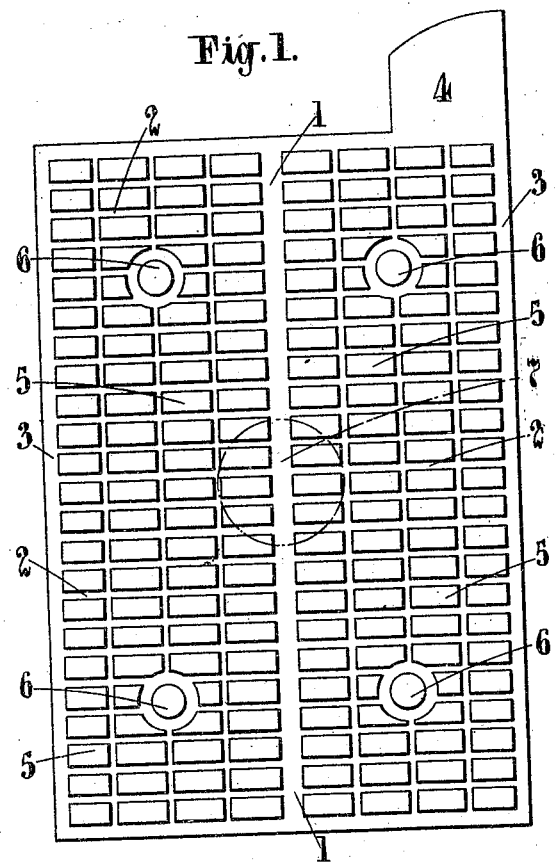

April 14, 1931.  S. J. WILLIAMS  1,800,422

ELECTRICAL STORAGE BATTERY

Filed Aug. 17, 1927

INVENTOR
Sidney James Williams
BY Dowell and Dowell
ATTORNEYS

Patented Apr. 14, 1931

1,800,422

UNITED STATES PATENT OFFICE

SIDNEY JAMES WILLIAMS, OF KENSINGTON, ENGLAND

ELECTRICAL STORAGE BATTERY

Application filed August 17, 1927, Serial No. 213,614, and in Great Britain April 11, 1927.

This invention relates to electrical accumulators or storage batteries and particularly to the types thereof wherein the plates of a group of cells are capable of regeneration after exhaustion.

It aims to provide plates of improved construction for batteries or accumulators enabling the same to be charged and re-charged at considerably increased rates and within greatly reduced periods of time under maintenance of a practically constant value of current during the charging operation. It also aims to increase the durability of the grid by lessening the liability of disintegration of the plates, either by reason of expansion, or by reason of heavier and quicker charging.

According to present practices, the lead-oxide is formed into a paste and pressed or forced into lead grids, or else blocks of the active material are arranged within a mould into which molten metal is run in around them, the grids being built up or placed in position and coupled together and also connected either to the source of energy from which they are charged or to the circuit to which they are desired to supply energy.

According to this invention, the lead-oxide is formed into hard blocks or cakes which are placed within a cast-iron mould constructed in two or more parts each having channels leading from a main channel communicating with the outside of the mould and the grids are formed with openings to allow expansion and contraction of the metal and of the lead-oxide blocks. Through the outside opening of the mould, the molten lead is then poured into the main channel from which it flows into cross and surrounding channels, thus forming a grid on or in each face of the block or cake of lead-oxide within. When the metal has cooled and the cast-iron mould has been opened, the blocks or cakes of lead-oxide will be held firmly in position between and with their edges surrounded by the leaden grids.

Instead of forming the grids upon the outside of the active material as described above, it may be done by forming grooves in the blocks of active material while still in a soft or plastic state and allowing the same to dry and harden, after which the grooved blocks are placed within a flat mould suitably formed and the molten metal run in as before, thereby forming a grid embedded in and level with the surfaces of the active material. The molten metal may be run into the grooves either by gravity or by die, or by pressure casting.

In order to increase the durability of accumulators and to ensure that the grids on opposite faces of the active material are maintained at the proper distance apart from each other, one or more holes are formed through the active material into which the molten metal will run when the grids are being cast, so that when the metal cools, a solid connection will be formed between the two faces of the grids and lock them in position relatively to each other. This will prevent any outward expansion of the grids under heavy charges. When only one hole is formed through the active material for locking purposes, it should be situated centrally of the plates. As an alternative measure, cages or frames may be embedded within the paste blocks which are then enclosed within the cast-iron mould and the molten lead poured into the latter so that the grids will be cast around it.

In order that the invention may be clearly understood and reduced to practice, it is hereinafter described by way of example with reference to the accompanying drawings which illustrate a form of accumulator plate constructed in accordance with the invention.

Figure 2:
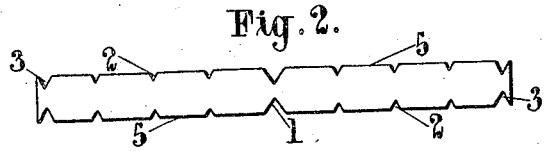

In said drawings, Fig. 1 is a side elevation of a plate embodying the invention and Fig. 2 is an end view of the core or block of active material grooved correspondingly with the form of grid illustrated in the first figure.

In Fig. 1 is shown a plate embodying a grid having a main channel part 1 formed by molten metal poured into the main channel part of the mould communicating with the outside of the latter; the numerals 2, 2, denote the cross-channel parts formed by communication with the main channel of the mould; and 3, 3, denote the surrounding channel or edge parts formed around the edge of the mould. The numeral 4 denotes the lug piece while 5 denotes the lead-oxide paste or core which may be formed into hard blocks. Openings 6, 6 are shown formed registerably in the grid and lead-oxide core to permit of expansion and contraction of these metallic bodies or parts of the plate. In dotted lines a hole 7 is represented at a point of location through the active material or core into which the molten metal will run when and as the grids are being cast, thereby forming a solid connection between opposed faces of the grids and locking them in position relatively to each other with the block or core therebetween.

In Fig. 2 is shown a block of active material formed with grooves arranged correspondingly with the parts of the grid as shown in the first figure, so that when placed within a suitably formed flat mould into which the molten metal is run as heretofore described, the grids will be formed within and level with the surfaces of the active material as a part of the latter.

Accumulators embodying plates constructed in accordance with the invention are capable of being charged and recharged more quickly than heretofore and by reason of the locking bars or bolts between the opposed faces of the grids enclosing the active material, the durability of the accumulator is considerably increased. Moreover, there is much less liability of the lead-oxide coming in contact with the hands or other parts of the operator while still in a plastic state.

Having thus described my invention, what I claim as new and desire to secure by Letters Patent of the United States is:—

An electrical accumulator plate comprising a hardened grooved block of lead-oxide paste and a metallic grid structure embodying grate-like plate portions embedded in the grooved portions of the block on opposite faces thereof so as to expose the greater portion of the block area through gaps in the grid, said block being enclosed within and edged by the grid structure with a portion of the latter extending therethrough to connect the plate-portions of the grid on opposite sides thereof, said block and grid being formed with registering perforate openings offset from and not extending to the marginal edges of either to allow expansion and contraction of their united bodies.

Signed at London, England, this twentieth day of July, 1927.

SIDNEY JAMES WILLIAMS.